United States Patent [19]

Dzieciuch et al.

[11] 4,451,543
[45] May 29, 1984

[54] RECHARGEABLE ZINC/MANGANESE DIOXIDE CELL

[75] Inventors: Matthew A. Dzieciuch, Dearborn Heights; Halina S. Wroblowa, West Bloomfield; Joseph T. Kummer, Ypsilanti, all of Mich.

[73] Assignee: Ford Motor Company, Dearborn, Mich.

[21] Appl. No.: 537,206

[22] Filed: Sep. 29, 1983

[51] Int. Cl.³ ............................................. H01M 6/04
[52] U.S. Cl. .................................. 429/206; 429/224; 429/229
[58] Field of Search ......... 429/206, 207, 224, 229–231

[56] References Cited

U.S. PATENT DOCUMENTS

| | | | |
|---|---|---|---|
| 3,348,973 | 10/1967 | Dirkse | 429/206 |
| 3,847,669 | 11/1974 | Paterniti | 429/206 |
| 3,969,147 | 7/1976 | Croissant et al. | 429/206 X |
| 3,997,900 | 8/1976 | Luehrs | 429/206 X |
| 4,195,120 | 3/1980 | Rossler et al. | 429/206 X |
| 4,209,577 | 6/1980 | Clash | 429/206 |

Primary Examiner—Charles F. LeFevour
Attorney, Agent, or Firm—William F. Johnson; Olin B. Johnson

[57] ABSTRACT

A rechargeable cell is disclosed which is characterized in the following manner. A positive electrode is formed from a manganese oxide electrode material. This manganese oxide electrode material contains a heavy metal selected from the group comprising lead, bismuth, and mixtures of lead and bismuth. The cell also contains a negative electrode of zinc. A separator is provided between the positive electrode and the negative electrode. An alkaline electrolyte consisting essentially of an alcohol and an alkaline hydroxide is also contained in the rechargeable cell in contact with both the positive electrode and the negative electrode.

2 Claims, 1 Drawing Figure

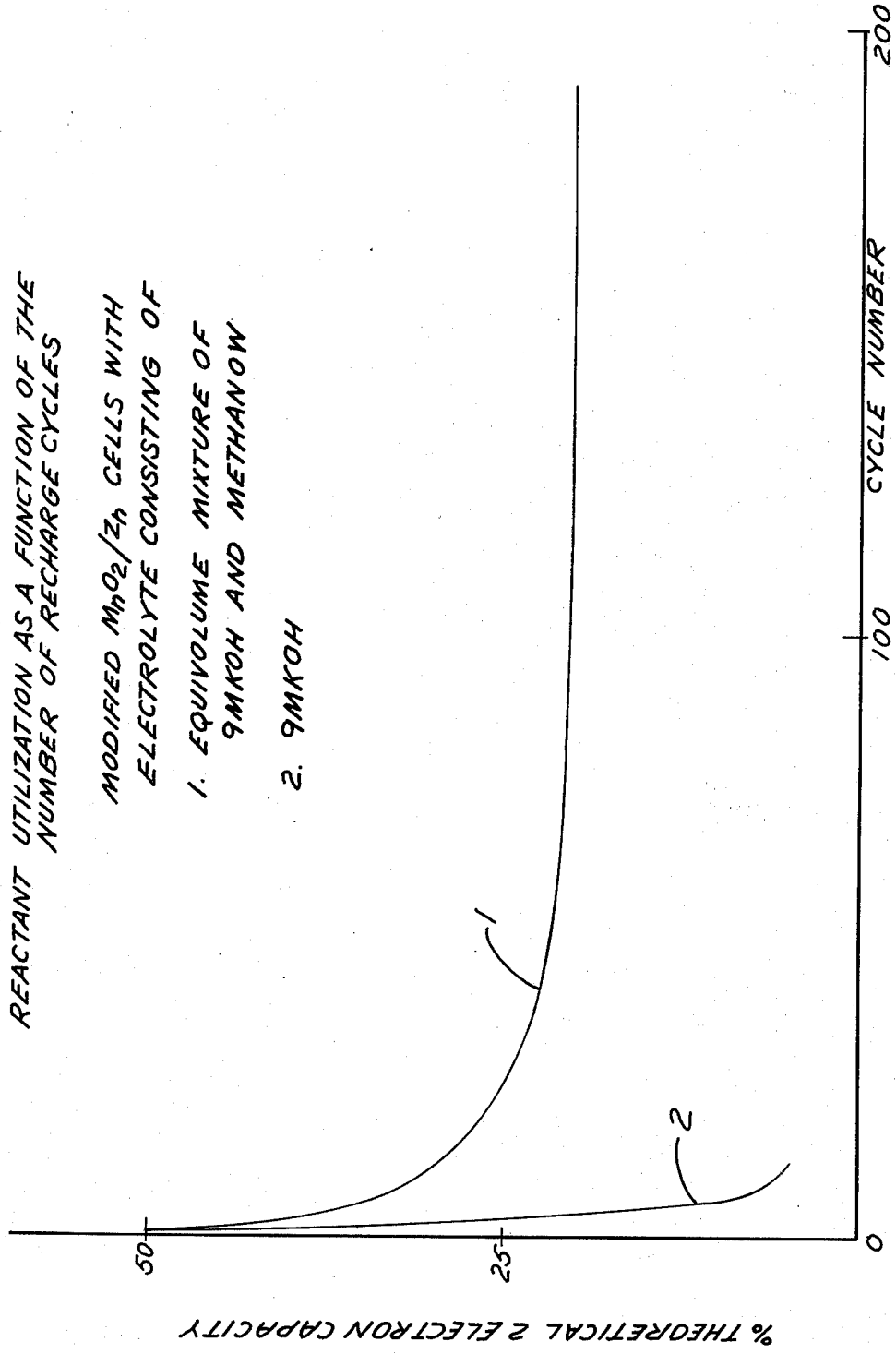

RECHARGEABLE ZINC/MANGANESE DIOXIDE CELL

TECHNICAL FIELD

This application is directed to a rechargeable cell and, in particular, to a rechargeable zinc/manganese dioxide cell.

BACKGROUND ART AND PRIOR ART STATEMENT

No search was conducted on the subject matter of this specification in the U.S. Patent and Trademark Office or in any other search facility. We are unaware of any prior art more relevant to the subject matter of this specification than that which will be set forth below.

Ford Motor Company, the assignee of this application, is also assignee of two patent applications which deal with modified electrode materials, to wit: "Rechargeable Manganese Dioxide Electrode Material-I", filed Aug. 8, 1983, given Ser. No. 521,473; and "Rechargeable Manganese Oxide Electrode Materials", filed Aug. 8, 1983, given Ser. No. 521,474. These two applications are hereby incorporated by reference.

Briefly, the first application is directed to an improved manganese dioxide electrode material, the material being one which may be cycled between discharged and charged states at higher utilization of reactant and for substantially greater number of cycles than previously known manganese dioxide electrode materials. The improved manganese dioxide electrode material is characterized in that a heavy metal selected from the group consisting of bismuth, lead, and mixtures of bismuth and lead is included in the electrode material by means of a chemical reaction.

The second application mentioned above is directed to improved manganese oxide electrode materials. The manganese oxide electrode materials may be cycled between discharged and charged states at higher utilization of reactant and for a substantially greater number of cycles than previously known manganese dioxide electrode materials. The manganese oxide electrode materials are characterized in that a heavy metal selected from the group consisting of bismuth, lead, and mixtures of bismuth and lead is included in the electrode material without initial reaction of the electrode components.

The invention set forth in this specification is a rechargeable cell consisting of a positive, modified manganese dioxide or manganese oxide electrode, such as disclosed in the two above-mentioned patent applications, and a negative zinc electrode. As has been discussed more fully in the aforementioned applications, a discharged, unmodified manganese dioxide electrode can only be recharged a relatively small number of cycles of shallow depth of discharge, whereas a modified manganese dioxide or manganese oxide electrode, as set forth in the aforementioned applications, can be recharged in the absence of zincate ions, some 200–300 times at much higher depth of discharge. However, in the presence of zincate ions, in concentrations corresponding to those present in rechargeable alkaline zinc containing cells, the modified materials as taught in the aforementioned applications lose their ability to be recharged from the deeply discharged state within some 20 cycles or less. We have found that suppression of the zincate ion concentration to below 0.1 molar enables the construction of a rechargeable alkaline cell containing modified manganese dioxide or manganese oxide materials as the positive electrode and zinc as the negative electrode.

DISCLOSURE OF INVENTION

This invention is directed to a rechargeable cell and, more particularly, to a rechargeable cell which is characterized in the following manner. A positive electrode is formed from a manganese oxide electrode material which contains a heavy metal selected from the group comprising lead, bismuth, and mixtures of lead and bismuth. A negative electrode is formed of zinc. A separator is placed between the positive electrode and the negative electrode. An alkaline electrolyte consisting essentially of an organic liquid (such as alcohol) and an alkaline hydroxide is in contact with both the positive electrode and the negative electrode.

In accordance with detailed teachings of some of the preferred embodiments of this invention, the organic liquid is methanol and the alkaline hydroxide is potassium hydroxide. In general, these two materials may be mixed in an equal volume proportion in order to form the alkaline electrolyte.

It has been found that the addition of certain organic materials suppresses the formation of zincate ions.

BRIEF DESCRIPTION OF THE DRAWING

The novel features that are considered characteristic of the invention are set forth with particularity in the appended claims. The invention itself, however, both as to its organization and its method of operation, together with additional objects and advantages thereof, will best be understood from the following description and specific embodiments when read in connection with the accompanying drawing which is a graph of the Reactant Utilization as a Function of the Number of Recharge Cycles for various test materials set forth in the examples.

BEST MODE AND INDUSTRIAL APPLICABILITY

The following description is what we consider to be a preferred embodiment of our rechargeable cell having a negative zinc electrode. The following description also sets forth what we contemplate to be the best mode of carrying out the manufacture of our improved rechargeable cell. This description of the preferred embodiment is not intended in any manner to be a limitation upon the broader principles of this rechargeable cell having a negative zinc electrode, and while preferred materials are used to form parts of this rechargeable cell in accordance with the requirements of the laws, it does not mean that other materials cannot be used to make this rechargeable cell.

EXAMPLES 1. Modified Manganese Dioxide/Zinc Cell with Electrolyte Consisting of Equal Volume Mixture of KOH and Methanol 0.145 grams of the chemically prepared $BiMn_xO_y.2\text{-}H_2O$ was mixed with 1.377 grams of graphite (Union Carbide SP-1), 0.220 grams acetylene black (Shawinigan Chemical Company) for 5–10 minutes in a spex-mixer. This mixture was then mixed for an additional five minutes in the spex-mixer with 0.60 grams of 9M KOH containing 4 weight percent Biozan.

Electrodes were prepared by placing the above paste mixture onto a nickel screen and pressing at 10–20 tons per square inch in a die. The electrodes were then wrapped in a layer of Pellon and three layers of microporous polypropylene (Celgard 3401), which materials act as separators.

A zinc counterelectrode was wrapped in Pellon. The assembled cell was sealed in a polyethylene bag and electrolyte introduced and allowed to soak overnight. The electrolyte was an equal volume mixture of 9M KOH and methanol. Results of cycling this cell at a constant current density of 0.1 $Ag^{-1}Mn$ are shown in the FIGURE as curve 1. This curve shows that the cell had a charge acceptance capacity approaching 25% of the theoretical two electron capacity even after 200 cycles.

2. Modified Manganese Dioxide/Zinc Cell with Electrolyte Consisting of KOH

A cell assembled as described in Example 1 was sealed in a polyethylene bag. To this bag was added 9M KOH and allowed to soak overnight. Results of cycling of this cell in 9M KOH are shown in the FIGURE as curve 2. This shows that when no alcohol was added as part of the electrolyte, the rechargeability of the cell was very poor.

While methanol has been illustrated as the material to be mixed in forming the alkaline electrolyte along with potassium hydroxide, it is readily apparent to a skilled artisan that other organic materials may be used such as higher alcohols, glycols, etc., and their derivatives, and that other alkaline hydroxide materials may be used such as sodium hydroxide, lithium hydroxide, etc. It is preferred to mix these material in equal volume proportions, but that is not necessary.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:
1. A rechargeable cell which is characterized by:
    a positive electrode formed from a manganese oxide electrode material which contains a heavy metal selected from the group consisting of lead, bismuth, and mixtures of bismuth and lead;
    a negative electrode of zinc;
    a separator between said positive electrode and said negative electrode; and
    an alkaline electrolyte consisting essentially of an organic alcohol material and an alkaline hydroxide in contact with both said positive electrode and said negative electrode.
2. The rechargeable cell of claim 1, in which said organic material is methanol and said alkaline hydroxide is potassium hydroxide.

* * * * *

UNITED STATES PATENT AND TRADEMARK OFFICE
CERTIFICATE OF CORRECTION

PATENT NO. : 4,451,543

DATED : May 29, 1984

INVENTOR(S) : Dzieciuch et al

It is certified that error appears in the above-identified patent and that said Letters Patent are hereby corrected as shown below:

On the cover sheet, item [75] should read:

Matthew A. Dzieciuch, Dearborn Heights; Halina S. Wroblowa, West Bloomfield, Joseph T. Kummer, Ypsilanti, Nirmal K. Gupta, Canton, all of Mich.

Signed and Sealed this

Sixteenth Day of July 1985

[SEAL]

*Attest:*

DONALD J. QUIGG

*Attesting Officer*  Acting Commissioner of Patents and Trademarks